(12) United States Patent
Ekin et al.

(10) Patent No.: US 8,872,822 B2
(45) Date of Patent: Oct. 28, 2014

(54) VISUALIZATION OF TEMPORAL DATA

(75) Inventors: Ahmet Ekin, Eindhoven (NL); Radu Serban Jasinschi, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 803 days.

(21) Appl. No.: 12/682,791

(22) PCT Filed: Oct. 9, 2008

(86) PCT No.: PCT/IB2008/054136
§ 371 (c)(1),
(2), (4) Date: Apr. 13, 2010

(87) PCT Pub. No.: WO2009/050618
PCT Pub. Date: Apr. 23, 2009

(65) Prior Publication Data
US 2010/0238170 A1 Sep. 23, 2010

(30) Foreign Application Priority Data
Oct. 15, 2007 (CN) .......................... 2007 1 0152498

(51) Int. Cl.
*G06T 17/00* (2006.01)
*G06T 7/00* (2006.01)

(52) U.S. Cl.
CPC ..... *G06T 7/0081* (2013.01); *G06T 2207/10088* (2013.01); *G06T 7/0012* (2013.01); *G06T 2207/10096* (2013.01); *G06T 2207/30004* (2013.01)
USPC .......................................................... 345/424

(58) Field of Classification Search
CPC ................................ G06T 15/08; G06T 17/00
USPC .......................................................... 345/424
See application file for complete search history.

(56) References Cited

U.S. PATENT DOCUMENTS

| | | | | |
|---|---|---|---|---|
| 5,410,250 A | * | 4/1995 | Brown | 324/309 |
| 5,638,465 A | * | 6/1997 | Sano et al. | 382/281 |
| 5,859,891 A | * | 1/1999 | Hibbard | 378/62 |
| 6,169,817 B1 | * | 1/2001 | Parker et al. | 382/131 |
| 6,466,687 B1 | * | 10/2002 | Uppaluri et al. | 382/128 |
| 6,505,064 B1 | | 1/2003 | Liu et al. | |
| 7,366,334 B2 | * | 4/2008 | Yokota et al. | 382/128 |
| 7,376,253 B2 | * | 5/2008 | Spreeuwers et al. | 382/131 |
| 7,599,542 B2 | * | 10/2009 | Brockway et al. | 382/132 |
| 7,764,840 B2 | * | 7/2010 | Gendron et al. | 382/225 |
| 2001/0008562 A1 | * | 7/2001 | Rogers et al. | 382/132 |
| 2003/0095147 A1 | * | 5/2003 | Daw | 345/771 |
| 2004/0096088 A1 | | 5/2004 | Kohle | |

(Continued)

OTHER PUBLICATIONS

Susmita Datta and Somnath Datta, "Comparisons and validation of statistical clustering techniques for microarray gene expression data", Bioinformatics, vol. 19 No. 4 2003, pp. 459-466.*

(Continued)

*Primary Examiner* — Javid A Amini
*Assistant Examiner* — Jin Ge (57) ABSTRACT

Temporal data is analyzed and visualized with medical images. Visualizing temporal data includes providing a set of temporal data, detecting the number of distinct regions (40, 41) in the temporal data, based on the temporal behavior of the data, identifying and assigning a color scheme to each region and visualizing each region in accordance with the assigned color scheme. In embodiments, the number of distinct regions is detected based on the use of a clustering algorithm.

18 Claims, 11 Drawing Sheets

(56) References Cited

U.S. PATENT DOCUMENTS

| | | | |
|---|---|---|---|
| 2006/0018548 A1 | 1/2006 | Chen et al. | |
| 2006/0110018 A1 | 5/2006 | Chen et al. | |
| 2006/0228015 A1* | 10/2006 | Brockway et al. | 382/132 |
| 2007/0036402 A1* | 2/2007 | Cahill et al. | 382/128 |
| 2008/0080770 A1* | 4/2008 | Mendonca et al. | 382/180 |
| 2009/0279778 A1* | 11/2009 | Ekin | 382/170 |
| 2010/0066756 A1* | 3/2010 | Yang | 345/593 |
| 2010/0226552 A1* | 9/2010 | Ekin | 382/131 |

OTHER PUBLICATIONS

Haojun Sun, Shengrui Wang; Qingshan Jiang, "FCM-Based Model Selection Algorithms for Determining the Number of Clusters", Pattern Recognition 37 (2004) 2027-2037.*

Chris Fraley and Adrian E. Raftery, "How Many Clusters? Which Clustering Method? Answers Via Model-Based Cluster Analysis", The Computer Journal (1998) 41 (8): 578-588.*

Isabelle Guyon and Andre Elisseeff, "An Introduction to Variable and Feature Selection", Journal of Machine Learning Research 3 (2003) 1157-1182.*

D. Pelleg and A. Moore, "X-means: Extending K-means with efficient estimation of the number of clusters," in Proc. 17th Int. Conf. Machine Learning (ICML'00), 2000, pp. 727-734.*

Rui Xu and Donald Wunsch II, "Survey of Clustering Algorithms", IEEE Transactions on Neural Networks, vol. 16, No. 3, May 2005.*

Tilman Lange, Volker Roth, Mikio L. Braun, and Joachim M. Buhmann Neural Computation, "Stability-Based Validation of Clustering Solutions", Jun. 2004, vol. 16, No. 6 , pp. 1299-1323.*

Andrew W. Moore, "K-means and Hierarchical Clustering", School of Computer Science Carnegie Mellon University, Nov. 16, 2001.*

John (Juyang) Weng, Ajit Singh, and M. Y. Chiu, "Learning-Based Ventricle Detection from Cardiac MR and CT Images", IEEE Transactions on Medical Imaging, vol. 16, No. 4, Aug. 1997.*

Castellani et al: "Towards Information Visualization and Clustering Techniques for MRI Data Sets"; Artificial Intelligence in Medicine, Lecture Notes in Artificial Intelligence, LNAI, vol. 3581, Jan. 2005, pp. 315-319.

Salvador et al: "Determining the Number of Clusters/Segments in Hierarchical Clustering/Segmentation Algorithms"; Proceedings of the 16th IEEE International Conference on Tools With Artificial Intelligence (ICTAI 2004), pp. 576-584.

Chen et al: "Automatic Identification and Classification of Characteristic Kinetic Curves of Breast Lesions on DCE-MRI"; Medical Physics, AIP, vol. 33, No. 8, pp. 2878-2887.

Piccoli: "Contrast-Enhanced Breast MRI:Factors Affecting Sensitivity and Specificity"; Eur. Radiology, vol. 7, (Suppl. 5), 1997, pp. S281-S288.

Torheim et al: "Feature Extraction and Classification of Dynamic Contrast-Enhanced T2*-Weighted Breast Image Data"; IEEE Transactions on Medical Imaging, vol. 20, No. 12, Dec. 2001, pp. 1293-1301.

* cited by examiner

VISUALIZATION OF TEMPORAL DATA

FIELD OF THE INVENTION

The invention relates to analysis and visualization of temporal data, and in particular to the area of visualization of temporal data associated with medical images.

BACKGROUND OF THE INVENTION

Medical imaging systems such as magnetic resonance imaging (MRI) are capable of producing exact cross-sectional image data that express the physical properties related to the human or animal body. Reconstruction of three-dimensional (3D) images using collections of parallel 2D images representing cross-sectional data has been applied in the medical field for some time.

In many instances, medical images are acquired in connection with injection of a contrast agent in order to enhance features of interest in the acquired images. Traditionally, medical images are analysed in terms of difference images of images that are taken before the injection and at an appropriate time instant after the injection. The assumption is that the difference image of the images taken before and after the injection will show interesting regions, such as blood vessels and/or tumour regions.

Contrast-enhanced image analysis is applied in clinical cases, such as diagnosis and follow-up studies, as well as in pre-clinical cases, such as investigation of potential disease cases.

In general, despite the availability of detailed 3D images of the body part under investigation it is still challenging for the clinical user to efficiently extract information from the data. The clinical user typically needs to inspect a plurality of cross-sections and 2D visualizations of the anatomy and the quantitative analysis data and combine these mentally. This leads to inefficient analysis and decreases the reproducibility of the diagnostic workflow.

Moreover, with recent developments in imaging equipment, temporally resolved data has become available, resulting in even further possibilities to investigate the acquired images, but also leading to an even further increase in the amount of data that is acquired in connection with a case.

In the published patent application US 2006/0110018 a pattern recognition method is disclosed for automatic abnormal tissue detection and differentiation in temporal data using contrast-enhanced MR images. While, in the disclosure, problems relating to visualization of enormous data sets are understood and formulated, the disclosure provides a specific solution to the two-class problem of classifying difference images either as benign or malignant.

There is however an ever increasing need in the art for condensed and comprehensive visualization of quantitative data, which from its onset is not biased towards a known output, and in particular a more efficient way of analysing and visualizing spatial temporal data, that would improve the coupling between quantitative analysis data and anatomy for general input data.

SUMMARY OF THE INVENTION

The invention preferably seeks to mitigate, alleviate or eliminate one or more of the above mentioned disadvantages singly or in any combination. In particular, it may be seen as an object of the present invention to provide a method that solves the above mentioned problems, or other problems, of the prior art related to visualization of the temporal data.

This object and several other objects are achieved in a first aspect of the invention by providing a method of visualizing temporal data, the method comprising:
  providing a set of temporal data;
  detecting the number of distinct regions in the temporal data, based on the temporal behavior of the data;
  identifying and assigning a color scheme to each region; and
  visualizing each region in accordance with the assigned color scheme.

The present invention relates to the area of visualization of anatomy and associated quantitative analysis data derived from medical images. The medical images may be obtained in connection with a medical imaging technique, including but not limited to magnetic resonance imaging (MRI), computed tomography (CT), positron electron tomography (PET), single photon emission computed tomography (SPECT), ultrasound scanning, and rotational angiography. The set of temporal data may be provided in connection with injection of a contrast agent into a system under examination. Based on the obtained images, one or more sets of voxel data may be derived. In general, however, the present invention is applicable to any modality in medical imaging as well as non-medical data.

The invention is particularly, but not exclusively, advantageous for detecting, instead of pre-assuming, the number of temporally distinct regions in the temporal data; detection of this number being based on the temporal behavior of the data. Thus, only the temporal behavior of the data forms the basis for the visualization, not assumptions related to a sought-after result. The method in accordance with the present invention is an unsupervised learning method. Moreover, by identifying and assigning a color scheme to each detected region, and visualizing the region(s) in accordance with the assigned color scheme, the user is efficiently and comprehensively provided with clear knowledge about how many regions are present, and where these regions are located, again based only on the temporal behavior of the data, not on assumptions related to a sought-after result. Spotting medically important features from large medical data sets is challenging for the medical experts. The present invention provides an efficient way of doing so.

The present invention provides a method which projects temporally similar data into a reduced space, such as from a 3D+time space into a 2D or 3D space, which can be inspected by the medical expert both by 2D visualization or 3D visualization or a combination of 2D and 3D visualization. The projection of the data into a reduced space improves the quality and the reproducibility of the diagnostic workflow as well as the quantitative analysis.

In an embodiment, the number of regions in the temporal data is detected automatically. It is an advantage to detect this number automatically, since an efficient system is thus provided.

In an embodiment, the number of regions in the temporal data is detected by use of a clustering algorithm and a model selection algorithm. It is advantageous to use a clustering algorithm, since clustering algorithms may be a robust and versatile classification tool. Moreover, they do not require supervision or a priori learning stage.

In advantageous embodiments, the number of distinct regions in the temporal data is detected by first running the clustering algorithm for a range of input class values, thereby obtaining a range of class assignments. Subsequently, for each run of the clustering algorithm for the given number of classes, a statistical analysis stage detects the actual number of regions. Then, all of the actual number of regions are combined and analysed to provide the number of distinct regions in the temporal data. The statistical analysis may be based on an analysis of an intensity distribution associated with each class assignment in the range of class assignments. The statistical analysis may use thresholding in the class assignment. The merging of separate estimates of the numbers of regions may use the maximum operator by assigning the number that is supported most by all estimates as the final number. Efficient, transparent and robust embodiments for detecting the number of regions are thus provided.

In advantageous embodiments, a model temporal pattern is identified and compared to a temporal pattern of one or more regions. Regions with temporal patterns that are similar, in accordance with a similarity criterion, to the model temporal pattern are identified and visualized. It is an advantage of the embodiments of the present invention that regions are selected independent of a comparison with a model pattern, since a more versatile and efficient comparison may be made subsequent to, instead of in connection with, the selection of the regions. Algorithms for comparing patterns are known and available to the skilled person. The specific similarity criterion may be set in accordance with the choice of algorithms for pattern comparison.

In advantageous embodiments, for each region a set of features is assigned, and the set of features is displayed upon selection. For the medical practitioner, it is very efficient in connection with the diagnostic workflow, to be presented, possibly upon request, with a set of features for the entire region.

In accordance with a second aspect of the invention, there is provided a visualization system for visualizing temporal data, the system comprising an input unit, a detector unit, an assignment unit and a visualizing unit. The various units are implemented to perform the functionality of the first aspect. The visualization system may be implemented as a specially programmed general-purpose computer.

In accordance with a third aspect of the invention, there is provided a medical examination apparatus, further comprising an acquisition unit for acquiring medical image data in the form of one or more sets of voxel data. The acquisition unit may be a medical scanner.

In accordance with a fourth aspect of the invention, there is provided a computer program product having a set of instructions, when in use on a computer, to cause the computer to perform the steps of the first aspect of the invention.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

In connection with medical diagnostics, medical research or other fields and applications, medical images may be obtained and analysed with respect to the geometrical properties in the images of contrast patterns resulting from the injection of a contrast agent. Typically, a contrast agent may be used in order to enhance the contrast between regions of interest and background regions. In addition to geometrical properties (location, shape, etc.), contrast patterns may also possess a temporal dimension, and the information about the temporal progression of the accumulation may be relevant for the diagnosis, and for distinguishing between certain pathological cases as well as between pathological cases and healthy cases.

Figure 1:
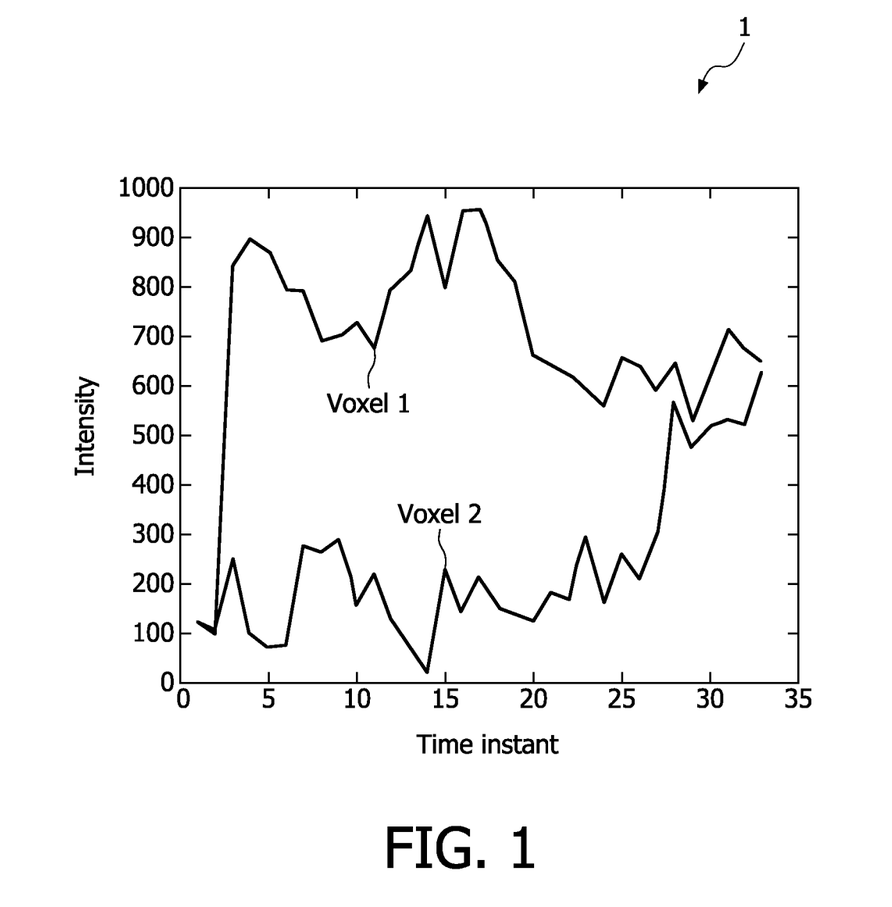
FIG. 1 shows a screen shot 1 illustrating the temporal variation of voxel intensity.

FIG. 1 illustrates a situation where the temporal information is needed in order to distinguish different patterns. The Figure is a screen shot 1, illustrating the temporal variation of the intensity depicted along the vertical axis of two voxels sites at 32 consecutive time instances, with the time progressing along the horizontal axis. If the traditional before/after contrast method was used, and the "after" images were taken at time instant 27 or later (as marked by reference numeral 2), the two voxel values would not be distinguishable from each other, although they have a very different temporal intensity pattern.

Embodiments of the present invention provide a method of finding and visualizing geometrical patterns with distinct temporal behavior.

In general, a set of temporal data is provided. The data may be spatial image data which evolve in time. For example, 2D image data with a time dimension (may be referred to as 3D data or 2D+time data; this is comparable to traditional movie data) or 3D image data with a time dimension (may be referred to as 4D data or 3D+time data; this is comparable to 3D movie data). In medical imaging, the spatial data will be 3D data. The invention is explained in connection with MRI images of songbirds. The data is 3D data acquired at a 256× 256×256 resolution at 32 different time instants, i.e. the total data dimension is therefore 32×256×256×256. The images were acquired in order to track and evaluate the seasonal evolution of the nervous system of songbirds, which is known to have seasonal variations depending on the mating period. As a contrast agent, Manganese (Mn) was injected into the brains of birds to track the cells in the nervous system. Even though the invention is disclosed in connection with MR images of the brain of songbirds, the invention is not limited to this type of images, as is clear to the skilled person. An important application of the present invention includes, but is not limited to, analysis and visualization of temporally resolved medical images obtained in connection with the injection of a contrast agent.

Figure 2:
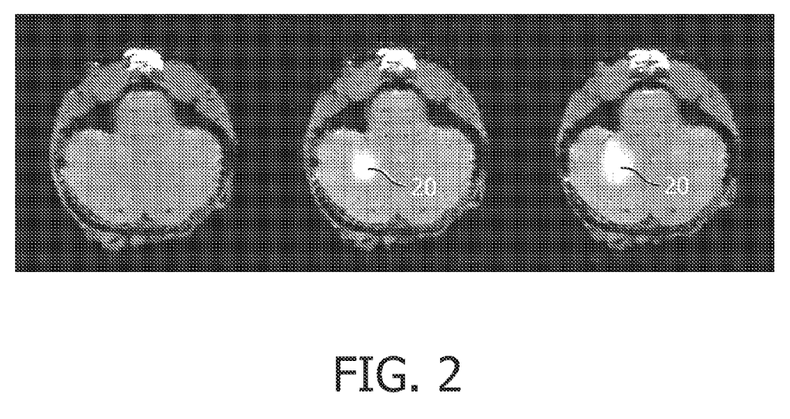
FIG. 2 illustrates MR images for three different time instants.

FIG. 2 illustrates MR images for three different time instants. A region 20 is observed to become brighter and spread out as time passes.

In order to temporally analyse the images, a number of steps are carried out. Prior to the temporal analysis, the data is typically pre-processed. The pre-processing may include alignment. Alignment of the data is performed in order to ensure that the same voxels occupy the same area of the imaged object for all images. Moreover, for some medical image modalities, e.g., MR, the intensity may vary from one scan to another or even from one image to another image of the same scan, and therefore the images may be normalized, e.g. by the use of intensity histograms. Moreover, additional image treatment may be performed in order to remove distortion, noise, or other effects in the images. Such pre-processing is known in the art.

The number of regions in the temporal data that exhibit distinct temporal behaviors is detected. Temporal patterns are considered to be different from one another when there is sufficient dissimilarity or distance between them. This dissimilarity or distance can be computed by known measures, such as Euclidean distance or absolute difference (L1 norm).

In an embodiment, the number of different regions is detected as follows.

For each voxel, a T-dimensional vector is constructed. T is the number of time instants the imaging has been performed. As a consequence, the feature points are T-dimensional vectors: $\vec{S}_i$, where i=1 ... N, N being the number of voxels. Two examples of $\vec{S}_i$ are shown in FIG. 1. By using these vectors, the problem can be formulated as to find the number of different groupings in $\vec{S}_i$. As an example, $\vec{S}_1$ would be equal to: $\vec{S}_1 = [I_1(t=t_0), \ldots, I_1(t=t_T)]$.

The detection of the number of differently occurring temporal intensity patterns can be considered as a model-selection problem. To identify the right model, that is the number of temporally distinct regions in the temporal data, a clustering algorithm is used. A clustering algorithm is commonly used for clustering data into groups that share some common traits. In connection with embodiments of the present invention, a number of clustering algorithms may be used, such as K-means, fuzzy C-means, or expectation-maximization.

A typical clustering algorithm expects the number of classes to be given, i.e. the number of groups into which it should divide the data. In advantageous embodiments of the present invention, this number is extracted automatically, even though semi-automatic detection is also possible, especially if the user desires to influence the determination process.

In order to detect the number of regions in the temporal data, the clustering algorithm is run for a range of input class values. A range of class assignments is thereby obtained. Typically, a clustering algorithm is run for each of the input class values in the range of 2 to 10, such as 3 to 6, or another appropriate range.

In the clustering, each voxel is classified into a class, so that each class contains voxels which share the same temporal behavior.

FIG. 3 illustrates screen shots 30 of the outputs of a clustering algorithm, or the class assignments of a K-means clustering algorithm for input class values of 3 input classes (FIG. 3A), 4 input classes (FIG. 3B), 5 input classes (FIG. 3C) and 6 input classes (FIG. 3D) after the application of the model-selection stage that results in 3 classes in each of the cases. The output is visualized by plotting the intensity value for each surviving cluster centre, resulting in three groupings being readily observable.

Figure 3A:
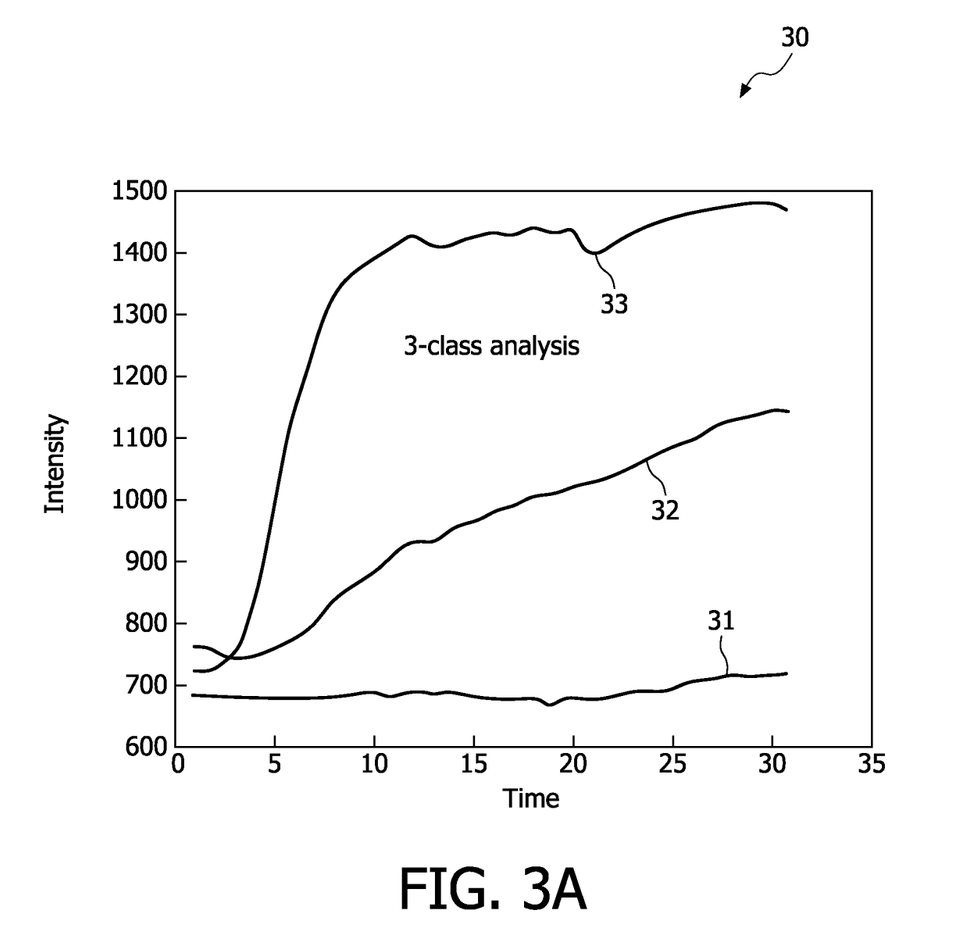
FIG. 3 illustrates screen shots of the outputs of a clustering algorithm.
Figure 3B:
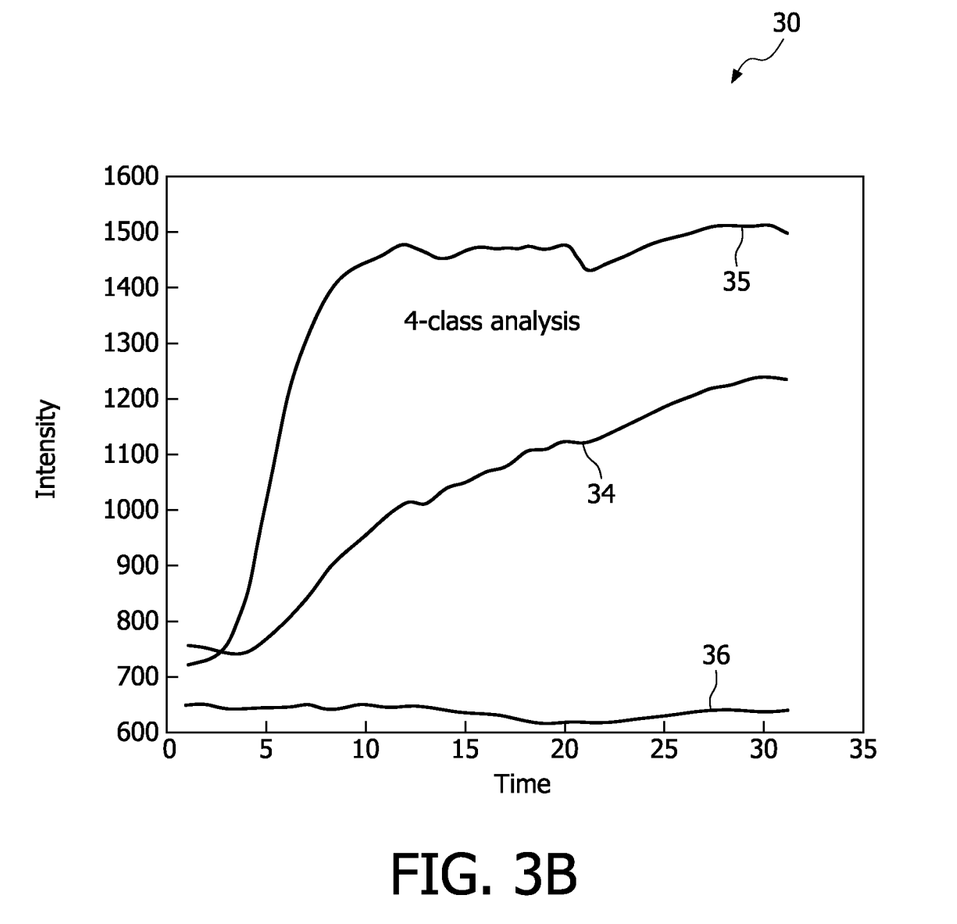
Figure 3C:
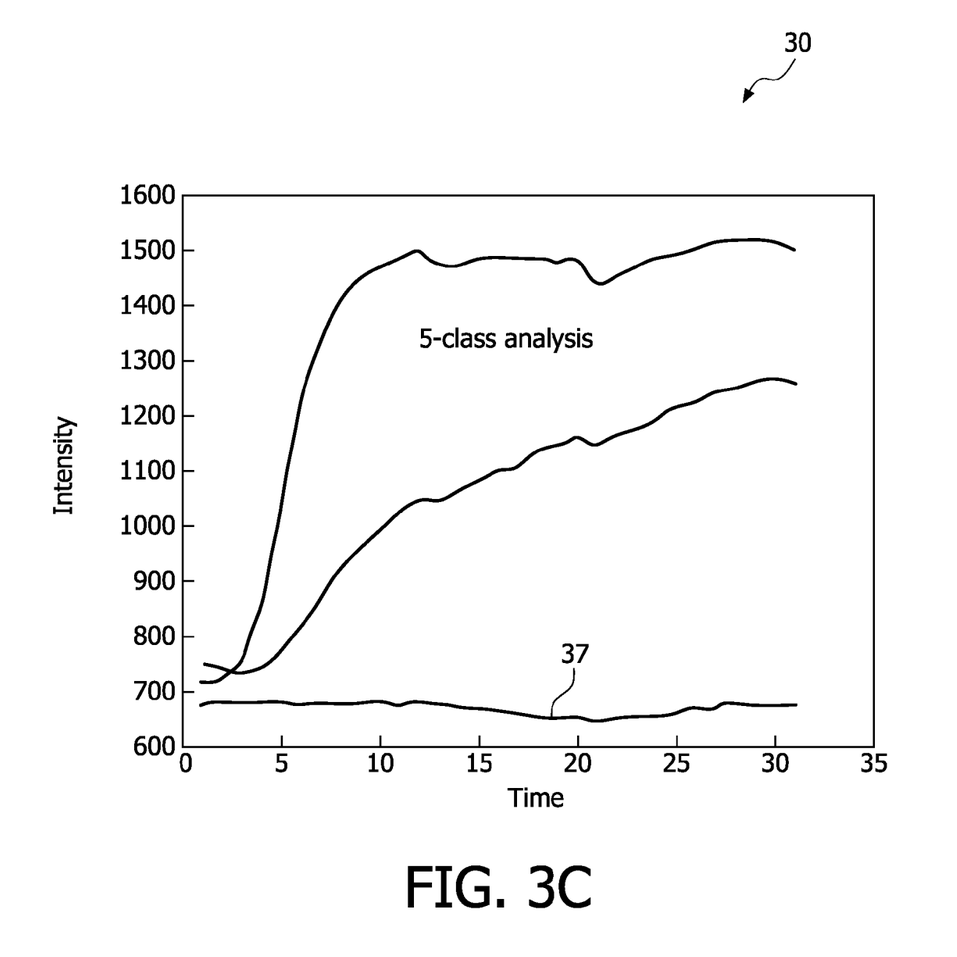
Figure 3D:
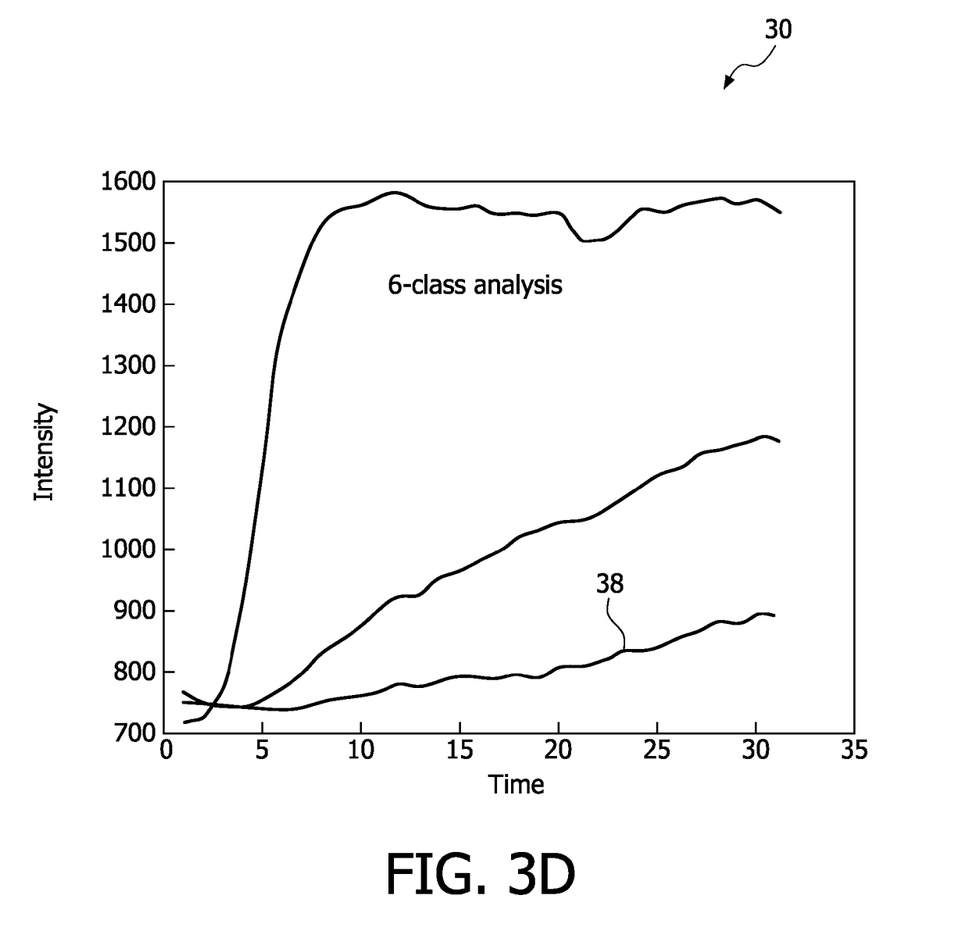

A background class 31, 36, 37, 38 is found, i.e. a class that exhibits no or little temporal behavior. A group 32, 34 that exhibits approximately linearly increasing intensity is found, and a group 33, 35 with a first steep increase in intensity, followed by an approximately constant high intensity level. From the output of the clustering algorithm, each voxel is classified. In FIG. 3A, the three classes are separated, however, in FIGS. 3B to 3D the background classes 36-38 contain two to four classes, respectively.

In an embodiment, the number of temporally distinct classes is extracted by the following analysis, which also refers to the model-selection stage.

In order to assign a class to a voxel, i.e. to determine whether a given voxel belongs to a temporally varying class or not, an adaptive threshold is determined. In an embodiment, the adaptive threshold is determined from a statistical analysis where the intensity range is computed for each class in the following manner:

for each voxel belonging to class i, compute its intensity distribution in the form of the intensity range by subtracting the maximum intensity value observed at that position from the minimum intensity value;

find the maximum of the intensity range for class i;

repeat the above steps for all clusters.

Because both the maximum and the minimum are noise sensitive, percentiles may replace the maximum and minimum values, such as the 95$^{th}$ percentile and 5$^{th}$ percentile values, respectively.

The maximum of the above (as many as the number of classes) is used to compute the threshold value as:

Thr1=(k* max intensity range of all clusters).

The value of k may generally be between 0 and 1. In embodiments, it may be pre-selected and/or adapted as a user setting. Typically, a value of 0.2 to 0.5 may be applied. In connection with the embodiment described in connection with the present invention, a value of k=0.3 is used.

Thus, a statistical analysis of each class assignment is made.

The above assumes at least one of the clusters exhibits temporal variation, that is, the data shows contrast agent accumulation at a certain region.

To guarantee that the algorithm works even when the data does not have any contrast agent accumulation, i.e., all clusters are background clusters, the threshold can be compared with a minimum value, Thr_min, which in an embodiment is assigned as a percentage of the median intensity level of the data, for example 80% of the median intensity value may be required for a non-background intensity range.

Thus, the statistical analysis results in the obtaining of a threshold value. Each class is labelled as being a background or non-background class in accordance with the threshold. If a class contains one or more voxels with an intensity variation that is larger than or, in accordance with the settings, possibly equal to the threshold, Thr1 (and Thr_min if it is desired for some settings), the class is assigned and labelled as a temporally varying region, i.e. a non-background class. If a class does not contain a voxel with an intensity variation that is larger than Thr1, the class is assigned and labelled as a temporally constant region, i.e. a background class. It is also possible to require a certain percentage (e.g., 30%) of the class to have an intensity range above the threshold value to classify the region as non-background. In another embodiment, it is possible to compare only the class mean to classify the whole class as non-background or background.

From the labelled cases, one background and all non-background classes are selected, and the number of selected classes is set as the number of distinct regions, or regions in the temporal data that exhibit distinct temporal behavior. Each temporally varying region is identified and a color scheme is assigned to each region. The color scheme may be a single distinct color assigned to each region. The color scheme may however be more advanced, e.g. including a super-imposed pattern.

Figure 4:
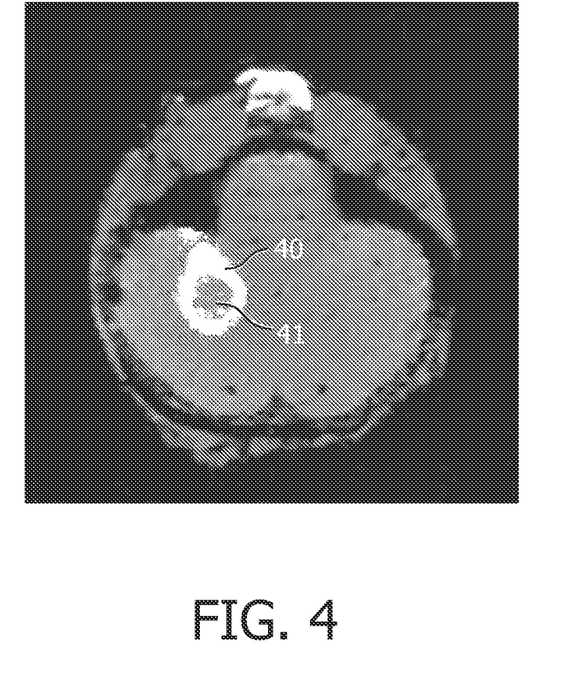
FIG. 4 illustrates a 2D visualization of identified regions.

FIG. 4 illustrates a 2D visualization of the identified regions. The image is a MRI slice including the identified regions. In the image at least four groups are observed, two background groups, and two regions that exhibit temporal variation. The two background groups include the spinal bone as seen as a bright spot in the top of the image, as well as the brain regions, which do not show a temporal variation, as seen in light grey.

In addition to the background regions, all temporally distinct regions are visualized in accordance with the assigned color scheme. In general, colors are used in the visualization; however, in FIG. 4 the regions are visualized in grey levels. A first region is illustrated as a bright rim 40, enveloping a grey core structure 41.

By a comparison between FIG. 4 and any of the slices of FIG. 2, it is immediately clear from FIG. 4 that the viewer is much more efficiently provided with temporal information of the time-varying regions. For example, it is clear that even though only a geometrically single coherent region is affected, this region nevertheless contains two temporally distinct regions.

In addition to the visualization of the temporally distinct regions, a set of features may be extracted and assigned to the regions. The set of features may be extracted from the images or from auxiliary data or data analysis correlated with the images.

In an embodiment, a user may, possibly upon request, be presented with a set of features comprising such information as the number of voxels belonging to each group.

The set of features may comprise anatomical information of the different groups, such as the anatomical location, or in the event of a spread over more than one distinct anatomical structure, the distribution of each group to each structure. In order to derive anatomical information, the image may be compared to a segment model of the imaged objected in question. In general, any type of relevant information may be included in the set of features.

In an embodiment, the temporal behavior of a region may be statistically correlated to a model pattern, for example, by calculating a correlation value between the temporal behavior of the group and a model behavior, in order to assign a likelihood, such as a disease likelihood, to the region. Statistical correlation methods are known in the art, such as the Pearson correlation coefficient.

In an embodiment, a model temporal pattern is identified, for example from a library of temporal patterns. Each region may be compared to the model pattern or a selected region may be compared to the model region. Each region that is similar to the model temporal pattern in accordance with a similarity criterion is identified. The similarity or dissimilarity measure can be one of the known measures used. In one embodiment, Euclidean distance is used. In another embodiment, when the data is noisy, the L1 norm using the absolute value of the differences has shown to be more accurate. After that, each region is visualized by coloring the identified regions in accordance with a similarity color scheme. The region to be compared to the model temporal data may be automatically determined or user-defined. For example, all identified regions may automatically be compared to all model temporal patterns in a library. Alternatively, the medical practitioner may select a group of model temporal patterns that one or more regions should be compared to.

Figure 5A:
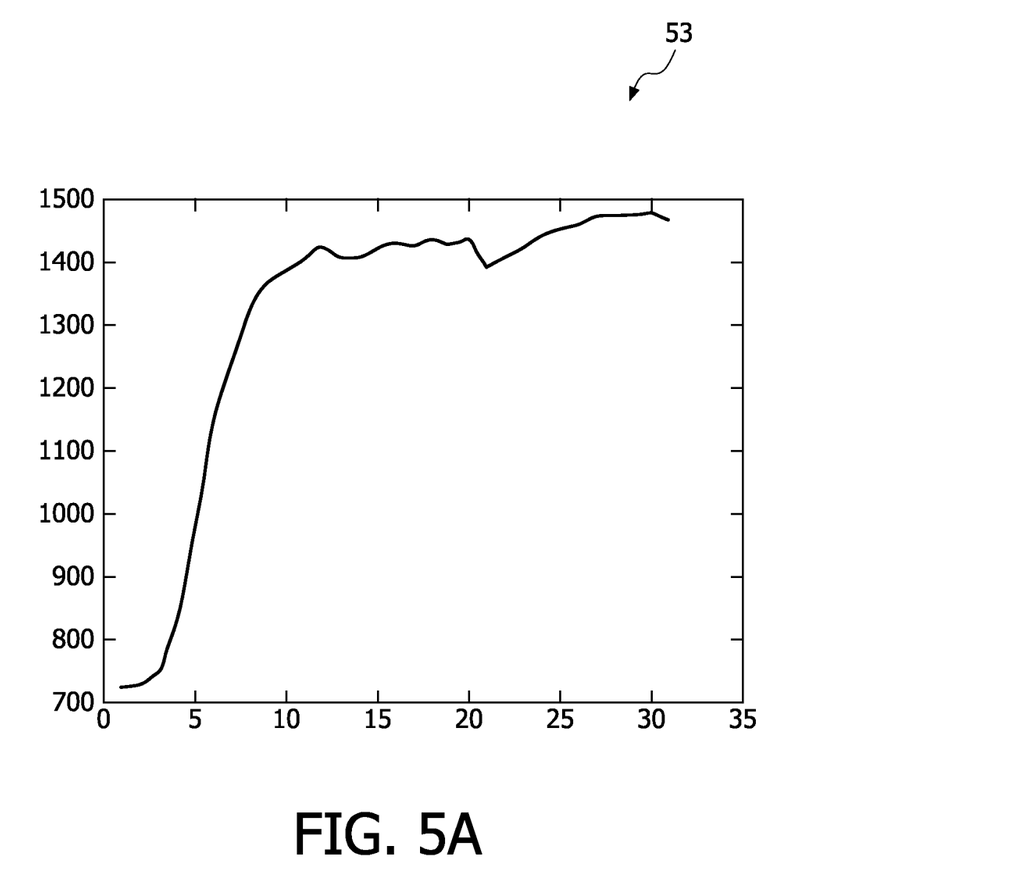
FIG. 5 illustrates aspects relating to identifying a model temporal pattern.

FIG. 5 illustrates aspects relating to identifying a model temporal pattern, and comparing the model temporal pattern to a temporal pattern of one or more regions that is similar to the model temporal pattern. FIG. 5A illustrates an example of a model temporal pattern 53, here in the form of a voxel temporal pattern from the groups of voxels having a temporal behavior denoted 33 and 35 in FIGS. 3A and 3B. A user may request that a comparison be based on the temporal patterns of FIG. 5A (or any other temporal pattern); alternatively a computer program may be implemented to automatically select the temporal behavior which will form the basis for the comparison.

Figure 5B:
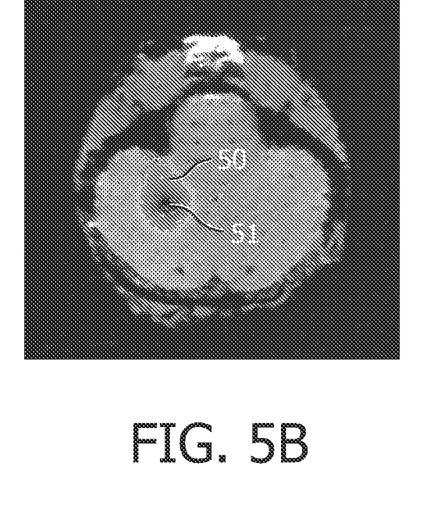
Figure 5C:
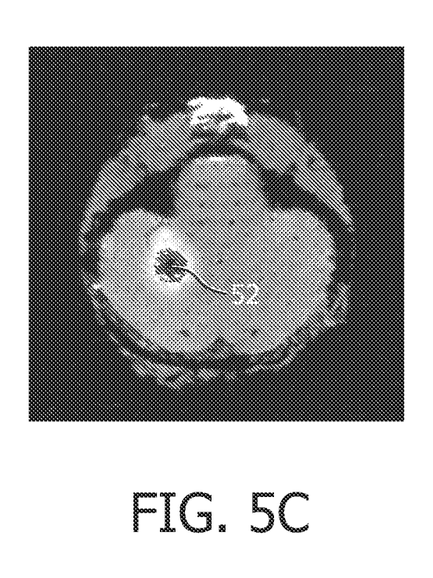

In FIG. 5B, the temporal behavior of all non-background regions, i.e. regions denoted 40 and 41 in FIG. 4, are compared to the temporal behavior of FIG. 5A. The comparison is based on a statistical correlation. The darker the area, the stronger the correlation is. In FIG. 5B, the region denoted 50 has a low correlation, whereas the region denoted 51 has a high correlation. This could be expected in the presented case, since the temporal behavior of FIG. 5A relates to the group of voxels assigned to the region denoted 41 and 51. In FIG. 5C, only the region denoted 52 is selected for comparison, and, as can be seen, again a high correlation is found, as could be expected. In FIGS. 5B and 5C, the similarity criterion thus is the correlation value, and the similarity color scheme is set as a gradient from light to dark in accordance with increased correlation. In general, other similarity criteria may be set up. For example, a specific correlation value may be set, and regions with a correlation value above or equal to this setting are identified, for example by coloring such regions with a single color.

Figure 6:
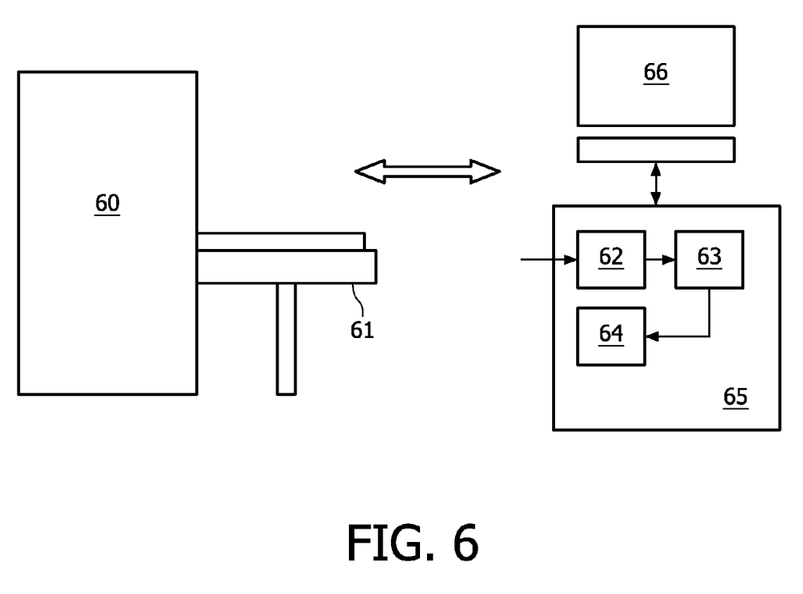
FIG. 6 schematically illustrates components of a visualization system.

FIG. 6 schematically illustrates components of a visualization system in accordance with the present invention, incorporated in a medical examination apparatus. As indicated schematically in FIG. 6, the medical examination apparatus typically includes a bed 61 on which the patient lies or another element for localizing the patient relative to the acquisition unit 60. The acquisition unit may be a medical imaging apparatus, such as a MR scanner, or another medical scanner. The acquisition unit acquires temporal medical image data in the form of one or more time-resolved sets of voxel data. The image data is fed into a visualization system.

The temporal image data is received in an input unit 62. In a detector unit 63 the number of distinct regions in the temporal data is detected based on the temporal behavior of the data. In an assignment unit 64, the detected regions are identified and a color scheme is assigned to each region. The data is visualized by a visualizing unit 66, typically in the form of a computer screen. The elements of the visualization system may be implemented by one or more data processors 65 of a general-purpose or dedicated computer.

Figure 7:
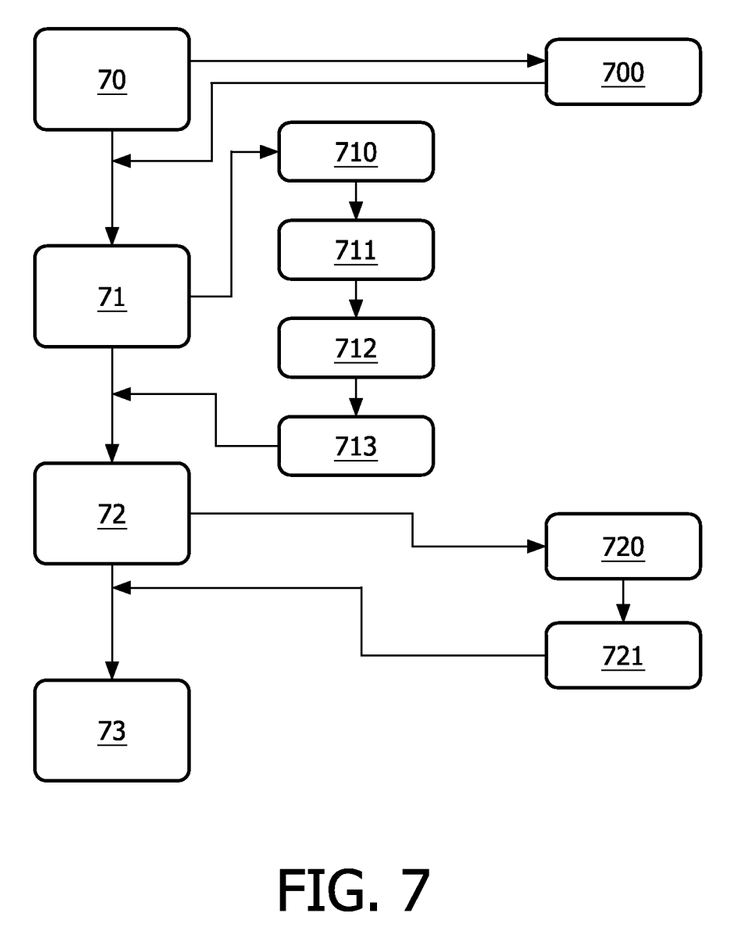
FIG. 7 is a flow chart showing steps in the method of visualizing temporal data.

FIG. 7 is a flow chart showing steps in the method of visualizing temporal data.

A set of temporal data is provided 70. The number of distinct regions in the temporal data is detected 71 based on the temporal behavior of the data. Each region is identified 72, and a color scheme is assigned to each region. Finally, each region is visualized 73 in accordance with the assigned color scheme.

In embodiments, the following steps may be performed:
70: Providing a set of temporal data:
700: pre-processing the data.
71: The number of regions in the temporal data may be detected by:
710: running a clustering algorithm for a range of input class values;
711: obtaining a range of class assignments;
712: detecting, for each input class value, i.e. for each run of the clustering algorithm, the number of actual regions in each class assignment from a statistical analysis of the class assignment, the statistical analysis being based on an analysis of an intensity distribution associated with each class assignment. From the statistical analysis a threshold value is obtained, and each class is labelled as a background class or a non-background class in accordance with whether or not an assigned intensity range of the class is below or above the threshold;

713: obtaining, from the range of actual numbers of regions, the number of distinct regions in the temporal data. Use can be made of the maximum operator such that the number that gets the largest number of votes is assigned as the estimated distinct number of regions.

72: Each region is identified 72, and a color scheme is assigned to each region:

720: each labelled class is identified as a temporally distinct region.

721: assign a color scheme to each region.

73: Visualize each region in accordance with the assigned color scheme.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method of visualizing temporal data, the method comprising, with one or more processors:
    receiving a set of temporal image data including a plurality of T-dimensional vectors, one for each voxel of an image describing evolution of the voxel over time, where T is a number of time instants an imaging technique has generated image data for the voxel;
    determining a number of distinct regions in the temporal image data based on temporal behavior of the temporal image data by use of a clustering algorithm and a model-selection algorithm, wherein the number of distinct regions in the temporal image data is determined by:
        first running the clustering algorithm for a range of input class values thereby obtaining a range of class assignments which group together voxels having similar temporal evolution of the respective T-dimensional vector;
        for each run of the clustering algorithm, performing a statistical analysis stage based on an analysis of an intensity distribution associated with each class assignment in the range of the class assignments to detect the number of distinct regions resulting in a threshold value calculated as a function of a maximum range of intensity over time of each class in the range of class assignments, wherein the maximum range is calculated for each class i in the range of class assignments according to the steps of:
            for each voxel belonging to class i, identifying a maximum intensity value observed at any time instant and identifying a minimum intensity value observed at any time instant;
            computing an intensity distribution of class i in the form of an intensity range by subtracting the maximum intensity value observed at each voxel from the minimum intensity value observed at each voxel; and
            from the intensity distribution of class i, identifying a maximum range for class i; and
        labelling each class as a background class or a non-background class in accordance with whether or not an intensity range of the class is below or above the threshold value, each labelled class being identified as a region, the classes assigned to the background class being counted as only one distinct region, and the actual number of distinct regions from each run of the clustering algorithm being combined to provide the number of distinct regions in the temporal data;
    identifying and assigning a color scheme to each distinct region; and
    controlling a display device to visualize each distinct region in accordance with the assigned color scheme.

2. The method according to claim 1, wherein the number of regions in the temporal data is detected automatically.

3. The method according to claim 1, wherein a model temporal pattern is identified, and wherein a temporal pattern of one or more regions that is similar to the model temporal pattern in accordance with a similarity criterion is identified, and wherein the identified one or more regions are visualized by coloring the identified regions in accordance with a similarity color scheme.

4. The method according to claim 3, wherein the temporal data includes time-intensity curves and each distinct region determined by the clustering algorithm includes like time-intensity curves.

5. The method according to claim 1, wherein for each region a set of features is assigned, and wherein the set of features is displayed upon selection.

6. The method according to claim 1,
    wherein the temporal data includes a time-intensity pattern for each pixel of a contrast-enhanced diagnostic image;
    wherein the distinct regions include groups of similar time-intensity patterns; and
    wherein visualizing includes colorizing each pixel of the contrast enhance diagnostic image in accordance with the color scheme assigned to the group of time-intensity patterns in which the time-intensity pattern of the each pixel is located.

7. The method according to claim 1, wherein the set of temporal data is provided in connection with injection of a contrast agent into a subject under examination.

8. The method according to claim 1, wherein the set of temporal data is provided from voxels of images generated using a technique selected from: magnetic resonance imaging (MRI), computed tomography (CT), positron electron tomography (PET), single photon emission computed tomography (SPECT), ultrasound scanning, temporal X-ray imaging, and rotational angiography.

9. A non-transitory computer-readable medium encoded with a computer program having a set of instructions, which, when implemented on a computer, causes the computer to perform the steps of claim 1.

10. The method according to claim 1, wherein the range of input class values for the clustering algorithm is one of 2 through 10.

11. A visualization system for visualizing temporal data, the system comprising one or more processors configured to:
receive a set of temporal image data;
detect a number of distinct regions in the temporal data based on the temporal behavior of the temporal image data, including automatically detecting the number of distinct regions in the temporal data by use of a plurality of runs of a clustering algorithm to identify classes of voxels of the temporal data having similar changes in intensity over time and a model-selection algorithm, the number of distinct regions being identified from the plurality of runs of the clustering algorithm by combining classes of voxels exhibiting little change into a class of background voxels, wherein each voxel is a T-dimensional vector where T is a number of time instances an imaging technique has been performed;
calculate for each class i of the identified classes, the temporal variation of the voxels in the class i by calculating:
a maximum intensity value observed at any time instant of the T time instants;
a minimum intensity value observed at any time instant of the T time instants;
a computed intensity distribution of the class i in the form of an intensity range by subtracting the maximum intensity value observed at each voxel from the minimum intensity value observed at each voxel;
the identified maximum range for the class i from the intensity distribution of the class i; and
identified maximum range of all of the classes of data;
identify and assign a color scheme to each region; and
control a display device to generate a visualization with each region colorized in accordance with the assigned color scheme.

12. The visualization system according to claim 11, wherein the one or more processor are further configured to:
calculate a range of class assignments based upon the clustering algorithm for a range of input classes which group together voxels having similar temporal evolution; and
statistically analyze each run of the clustering algorithm based on an analysis of an intensity distribution, to determine a threshold value calculated as a function of a maximum range of intensity over time of each class in the range of class assignments.

13. A method of visualizing temporal data, the method comprising:
receiving a set of temporal data using an imaging technique selected from: magnetic resonance imaging (MRI), computed tomography (CT), positron electron tomography (PET), single photon emission computed tomography (SPECT), ultrasound scanning, temporal X-ray imaging, and rotational angiography, for each voxel of an image generated by the imaging technique, determining a T-dimensional vector where T is the number of time instants the imaging technique has been performed;
detecting distinct regions in the temporal data based on a temporal behavior of the temporal data by use of a plurality of runs of a clustering algorithm over a range of input class values to identify classes of voxels having similar temporal intensity patterns of variation over the respective T-dimensional vectors, wherein identifying the classes of voxels includes:
for each class i of the identified classes, calculating a temporal variation of the voxels in the class i including:
identifying a maximum intensity value observed at any time instant of the T time instants;
identifying a minimum intensity value observed at any time instant of the T time instants;
computing an intensity distribution of the class i in the form of an intensity range by subtracting the maximum intensity value observed at each voxel from the minimum intensity value observed at each voxel; and
from the intensity distribution of the class i, identifying a maximum range for the class i;
identifying a maximum range of all of the classes of data;
calculating a threshold value as a function of the maximum range of all the classes of data;
comparing the temporal variation of each voxel in each class i with the threshold value; and
identifying each class i as a background class if the class i does not contain at least one voxel with an intensity variation that is larger than the threshold value;
extracting distinct regions from the runs of the clustering algorithm;
identifying and assigning a color scheme to each distinct region; and
visualizing each distinct region in accordance with the assigned color scheme.

14. The method according to claim 13, wherein the clustering algorithm classifies each voxel into a class such that each class contains voxels which share the same temporal behavior.

15. The method according to claim 13, wherein model selection algorithm extracts the number of distinct regions in the temporal data based on the number of classes of data identified as having similar temporal intensity patterns which are not identified as a background class, the classes identified as being background counting as a single class.

16. A visualization system for visualizing temporal data, the system comprising one or more processors configured to:
receive input from an input a set of temporal image data including a plurality of images of a common region collected over T repetitions of an imaging technique, each voxel of the images being defined by a T-dimensional vector;
detect a plurality of distinct regions in the temporal data based on the temporal behavior of the temporal image data, by use of a plurality of runs of a clustering algorithm to identify classes of voxels of the temporal data having similar changes in intensity over time and a model-selection algorithm, a number of distinct regions being identified from the plurality of runs of the clustering algorithm including:
computing an intensity range of each of the classes by subtracting a maximum intensity value observed in the T-dimensional vector defining each voxel from a minimum intensity value observed in the T-dimensional vector defining each voxel, and
identifying maximum ranges of all of the classes,
calculating a threshold value based on the identified maximum range of all the classes,
comparing the temporal variation of each voxel in each of the classes with the threshold value,
labelling each of the classes that does not contain at least one voxel with an intensity variation that is larger than the threshold value to the background class,
labelling each of the classes with at least one voxel with an intensity variation larger than the threshold as a non-background class;

group the classes assigned to the background class as one distinct region and combine an actual number of distinct regions from each run of the clustering algorithm to provide the number of distinct regions in the temporal data;

extract distinct regions from the runs of the clustering algorithm;

identify each region and assign a color scheme to each region; and visualize each identified region in accordance with the assigned color scheme.

17. The visualization system according to claim 16, further comprising an acquisition unit for acquiring medical image data in the form of one or more sets of voxel data.

18. The visualization system according to claim 16, wherein the one or more processors are further configured to identify model temporal patterns, and wherein a temporal pattern of one or more regions that is similar to the model temporal pattern in accordance with a similarity criterion is identified, and wherein the identified one or more regions are visualized by coloring the identified regions in accordance with the color scheme.

* * * * *